(12) United States Patent
Hoffman

(10) Patent No.: US 7,695,048 B2
(45) Date of Patent: Apr. 13, 2010

(54) SEAL FOR AN OPEN DOOR OF A VEHICLE

(75) Inventor: David Hoffman, Peosta, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 751 days.

(21) Appl. No.: 11/463,527

(22) Filed: Aug. 9, 2006

(65) Prior Publication Data

US 2008/0034683 A1 Feb. 14, 2008

(51) Int. Cl.
*B60J 5/10* (2006.01)
(52) U.S. Cl. ............. 296/152; 296/186.3; 296/186.1; 296/146.1; 296/154
(58) Field of Classification Search ............. 296/182.1, 296/186.1, 186.4, 146.1, 152, 154, 146.8, 296/146.11, 93, 186.3; 49/475.1, 498.1, 49/383; 52/173.2
See application file for complete search history.

(56) References Cited

U.S. PATENT DOCUMENTS

| 449,399 | A | | 3/1891 | Betham |
|---|---|---|---|---|
| 1,619,578 | A | | 3/1927 | Kirschbaum |
| 2,641,792 | A | | 6/1953 | Peeler |
| 2,912,727 | A | * | 11/1959 | Sehn ........................ 49/371 |
| 3,246,593 | A | | 4/1966 | Jacobs |
| 3,407,536 | A | | 10/1968 | Nystrom |
| 3,608,254 | A | * | 9/1971 | Sklamberg et al. ............. 52/27 |
| 3,875,954 | A | | 4/1975 | Frommelt et al. |
| 3,886,686 | A | * | 6/1975 | Urbanick .................. 49/490.1 |
| 4,638,612 | A | * | 1/1987 | Bennett ..................... 52/173.2 |
| 4,711,059 | A | * | 12/1987 | Layne ....................... 52/173.2 |
| 5,001,862 | A | | 3/1991 | Albenda |
| 5,280,990 | A | | 1/1994 | Rinard |

(Continued)

FOREIGN PATENT DOCUMENTS

EP 0698515 2/1996

(Continued)

OTHER PUBLICATIONS

The International Bureau, "International Preliminary Report on Patentability," issued in connection with counterpart international application No. PCT/US2007/074562, mailed Feb. 19, 2009, 8 pages.

(Continued)

*Primary Examiner*—Glenn Dayoan
*Assistant Examiner*—Gregory Blankenship
(74) *Attorney, Agent, or Firm*—Hanley, Flight & Zimmerman, LLC

(57) ABSTRACT

A truck, trailer or other type of vehicle with a pair of swinging door panels for providing access to a rear cargo bay includes a hinge seal that closes an air gap between the door panels and the side body panels of the vehicle when the door is open. The seal is particularly useful when used in conjunction with a dock shelter at a loading dock. The hinge seal can be mounted to each of the vehicle's rear door panels and sealingly engage the side body panels as the door opens, or the seal can be mounted to the side body panel and sealing engage the rear door panel. In either case, the seal provides substantially no resistance to the operation of the door hinge until just before the door is fully open.

21 Claims, 12 Drawing Sheets

U.S. PATENT DOCUMENTS

| | | | |
|---|---|---|---|
| 5,394,662 A * | 3/1995 | Giuliani et al. | 52/173.2 |
| 5,499,475 A * | 3/1996 | Court et al. | 49/495.1 |
| 5,964,499 A * | 10/1999 | Carter | 296/186.4 |
| 6,158,171 A * | 12/2000 | Kellogg et al. | 49/489.1 |
| 6,477,809 B1 * | 11/2002 | Dorner et al. | 49/383 |
| 7,007,988 B1 | 3/2006 | Doyle | |
| 2009/0045649 A1 * | 2/2009 | Eungard et al. | 296/186.4 |
| 2009/0064605 A1 * | 3/2009 | Hoffman | 52/173.2 |
| 2009/0295189 A1 * | 12/2009 | Distel et al. | 296/180.1 |

FOREIGN PATENT DOCUMENTS

| | | |
|---|---|---|
| GB | 2033456 | 5/1980 |

OTHER PUBLICATIONS

Patent Cooperation Treaty, "International Search Report," issued by the International Searching Authority in connection with counterpart PCT application No. PCT/US2007/074562, mailed Mar. 17, 2008, 6 pages.

Patent Cooperation Treaty, "Written Opinion of the International Searching Authority," issued by the International Searching Authority in connection with counterpart PCT application No. PCT/US2007/074562, mailed Mar. 17, 2008, 7 pages.

* cited by examiner

SEAL FOR AN OPEN DOOR OF A VEHICLE

TECHNICAL FIELD

The present disclosure generally pertains to vehicles that park at loading docks and more specifically to sealing an air gap between the vehicle's rear door panel and the vehicle's side body panel when the rear door panel is open.

DESCRIPTION OF RELATED ART

At the back end of trucks, trailers, and other vehicles, there is often a pair of swinging doors that provide access to the vehicle's rear cargo bay. A series of hinges on the vehicle's two rear vertical edges pivotally attach the door panels to the vehicle's side body panels. To access the cargo bay, the two door panels are swung outward away from the rear of the vehicle and temporarily stored against the exterior surface of vehicle's side body panels.

To add or remove cargo from the vehicle, the two door panels are swung open, and the vehicle backs into a loading dock in alignment with a doorway of a building. This, however, can leave a significant gap between the rear of the vehicle and the face of the building, thereby exposing the interiors of the building and the truck to the outside environment during loading and unloading. Such gaps can be at least partially sealed by installing a conventional dock shelter around the perimeter of the doorway.

Dock shelters typically have relatively rigid side members that protrude one to three feet from the outside face of the building. Side members can be made of wood framework, stiff foam, or other materials. Flexible panels or side curtains are usually attached to the protruding face of the dock shelter's side members. The side curtains lie generally parallel to the face of the building, and inner edges of the side curtains extend into the anticipated path of the truck backing into the dock. As the truck backs into the dock, the inner edges of side curtains sweep across the sides of the truck to provide sealing between the building and the rear side portions of the truck.

Since the vehicle's cargo bay should be opened before the vehicle backs into the dock shelter, the side curtains actually sweep across the two rear door panels, which are stored in their open position against the side of the vehicle. This, unfortunately, leaves a narrow vertical gap between each rear door panel and the adjacent side body panel. If wind blows against the side of the vehicle, the open door panel and the vehicle's side panel can channel that wind directly into the building, which can produce a very strong, uncomfortable draft for the dockworkers inside the building.

SUMMARY OF THE INVENTION

In some examples, a seal member is interposed between a vehicle's rear door panel and the vehicle's side body panel to help close a gap therebetween.

In some examples, the seal is attached to the rear door panel and spaced apart from the side body panel when the door is closed.

In some examples, the seal is attached to the side body panel and spaced apart from the rear door panel when the door is closed.

In some examples, the seal is hollow and is actuated by a source of pressurized air associated with a brake system of the vehicle.

In some examples, the seal is contained within a certain maximum width of the vehicle when the door is closed and extends beyond the maximum width when the door is open.

In some examples, the seal provides substantially no resistance to the operation of the door hinge until just before the door is fully open.

In some examples, the seal is squeezed between the rear door panel and the side body panel to create a squeezing force that contributes at least some sealing force between the rear door panel and a dock shelter.

DETAILED DESCRIPTION

Figure 1:
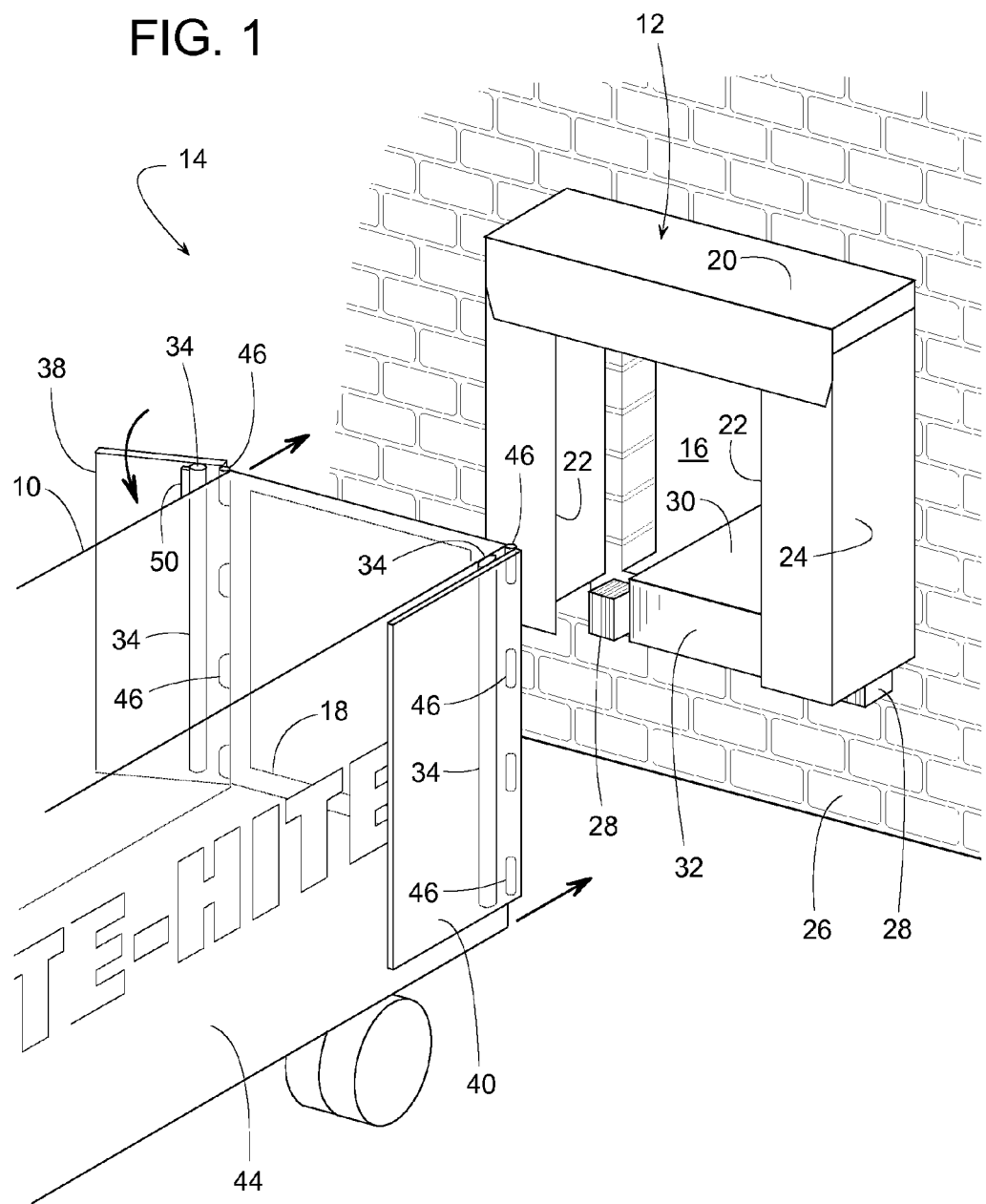
FIG. 1 is a perspective view of a vehicle backing into a loading dock, wherein the vehicle includes a novel hinge seal.
Figure 2:
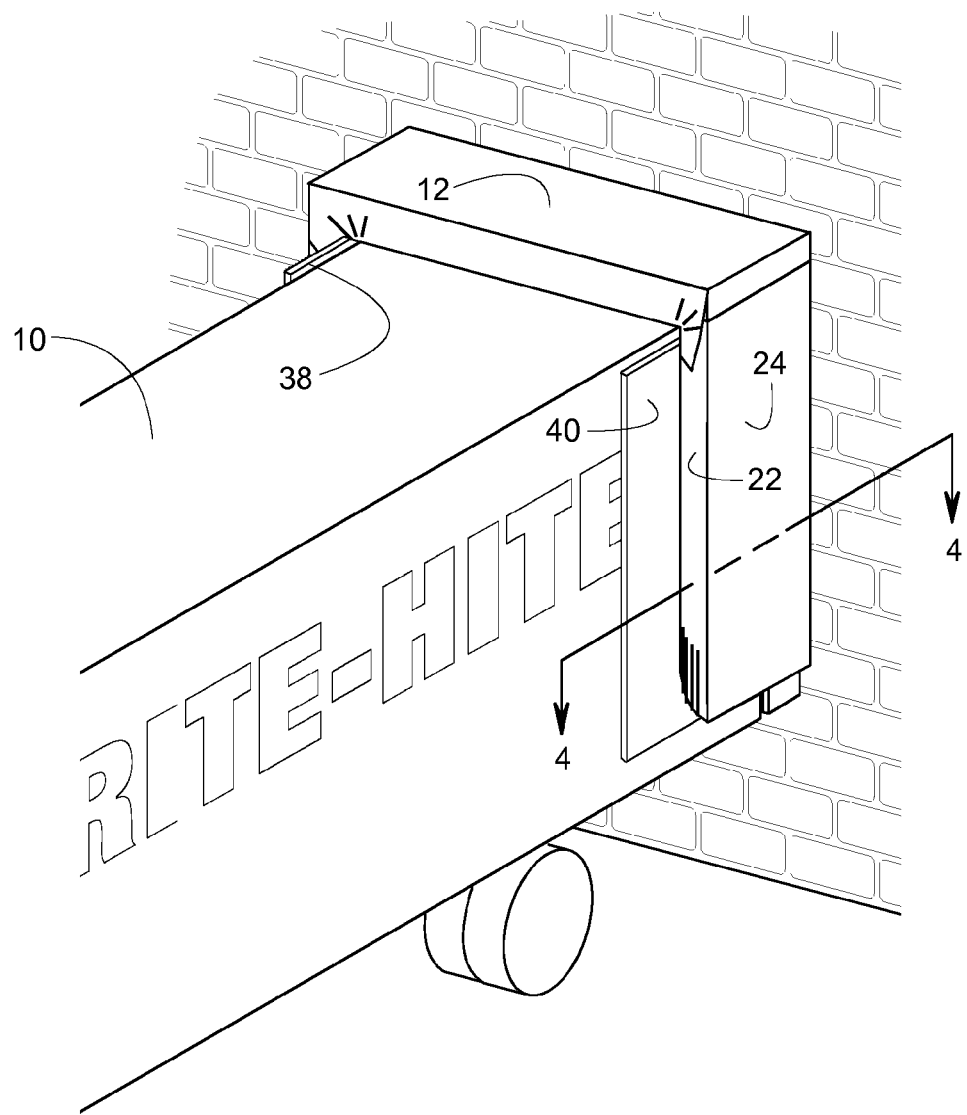
FIG. 2 is a perspective view similar to FIG. 1 but showing the vehicle having already backed into the dock.

FIG. 1 shows a vehicle 10, such as a truck or trailer, backing into a dock shelter 12 of a loading dock 14. FIG. 2 shows vehicle 10 having already backed into dock shelter 12. Dock shelter 12 is a well-known structure installed around a doorway 16 of a building 26 to help shelter an open rear cargo bay 18 of vehicle 10 as shipping materials are transferred between vehicle 10 and building 26. A typical dock shelter includes a header 20 for sealing against the roof of vehicle 10 and a set of flexible side curtains 22 for sealing the sides. Side curtains 22 can be supported by more rigid side members 24 that can be attached to building 26. As vehicle 10 backs into the dock, the inner edges of side curtains 22 sweep across the sides of the vehicle to provide sealing between building 26 and the rear side portions of vehicle 10. To aid in the loading and unloading operations, dock 14 may also include a set of bumpers 28 and a dock leveler 30, both of which are well known to those of ordinary skill in the art.

Figure 3:
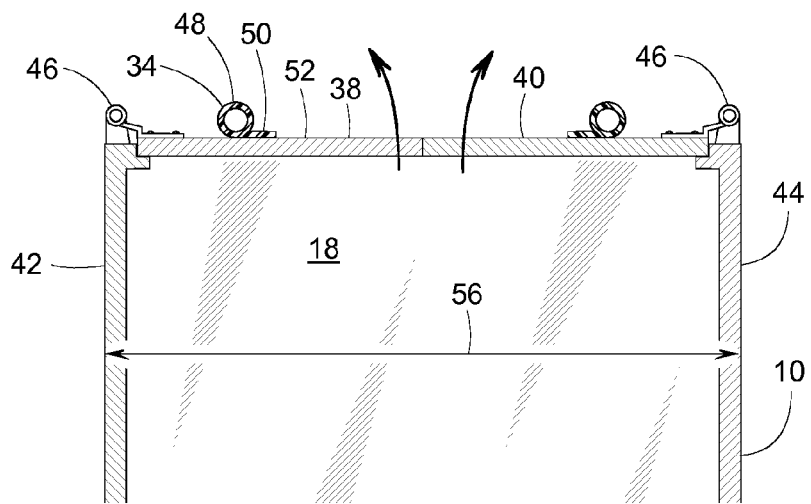
FIG. 3 is a cross-sectional view taken along line 4-4 of FIG. 2 but showing the vehicle's doors in a closed position.
Figure 4:
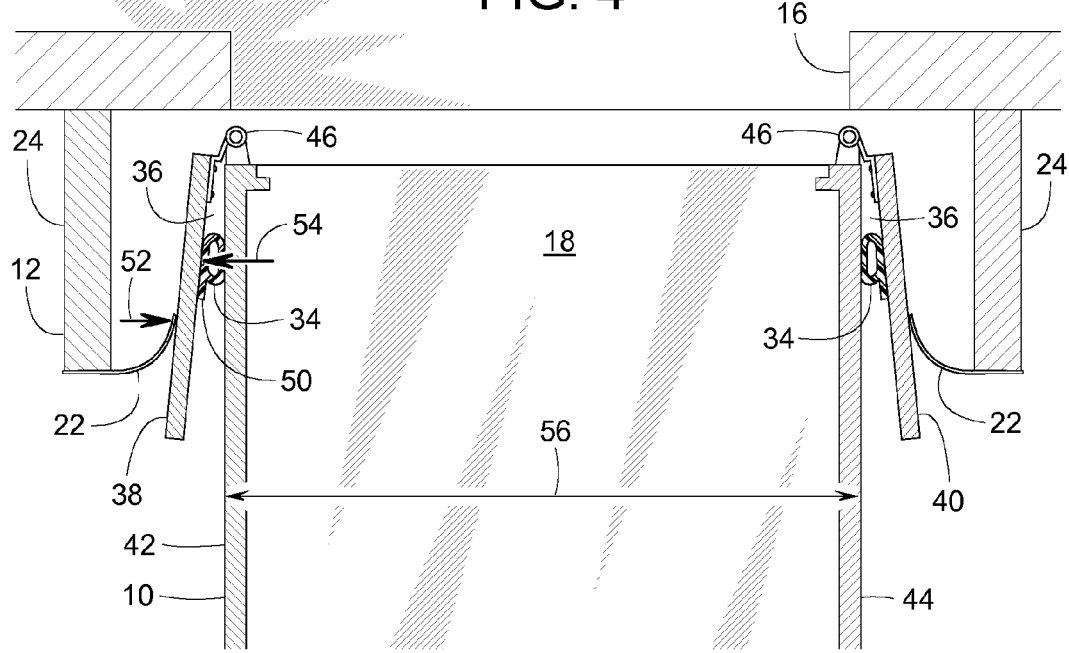
FIG. 4 is a cross-sectional view taken along line 4-4 of FIG. 2.

Referring further to FIGS. 3 and 4, although dock shelter 12 helps cover an upper portion and two sides of vehicle 10, and a lip 32 of dock leveler 30 helps seal the floor of the vehicle's cargo bay, a novel hinge seal 34 is used for closing a hinge gap 36 between each rear door panel 38 and 40 of vehicle 10 and the vehicle's side body panels 42 and 44. Door panels 38 and 40 provide access to the vehicle's rear cargo bay 18. To open and close the door, each rear door panel 38 and 40 is attached to a rear vertical edge of vehicle 10 via a series of vertically spaced-apart hinges 46 so that door panels 42 and 44 can be swung between a closed position (FIG. 3) and an open position (FIG. 4). Seal 34 may only be needed to close gap 36 when door panels 38 and 40 are at their open position and vehicle 10 is backed into a dock shelter, as shown in FIG. 4. Without seal 34, air between the rear door panels and the side body panels could blow through the space between the vertically spaced-apart hinges 46.

The structure and mounting configuration of seal 34 may vary. In FIGS. 3 and 4, for instance, seal 34 comprises a flexible polymeric tube 48 with a flange 50 for mounting seal 34 to a rear outer surface 52 of each door panel 38 and 40. Seal 34 extends substantially the full height of the door panels. When the door is closed, as shown in FIG. 3, seals 34 are spaced apart from side body panels 42 and 44. When the door is open, as shown in FIG. 4, seals 34 engage side body panels 42 and 44 to close gap 36. As a result, seal 34 creates no resistance to the operation of hinges 46 until just before the door is fully open.

When vehicle 10 is positioned within dock shelter 12 and the door is fully open, as shown in FIG. 4, side curtain 22 exerts a sealing force 52 against door panel 38, which squeezes seal 34 between door panel 38 and side body panel 42. The resilience of seal 34 creates a squeezing reaction force 54 that at least partially opposes sealing force 52.

With seal 34 attached to door panels 38 and 40, the seals are kept within a certain maximum width 56 of vehicle 10 when the door is closed, as shown in FIG. 3. If maximum width 56 is eight feet (plus a 2-inch margin), a Department of Transportation may consider vehicle 10 as being within a normal load width, as opposed to being an extra wide load. When, the door is open, as shown in FIG. 4, seal 34 may extend beyond width 56 without creating a problem.

Figure 5:
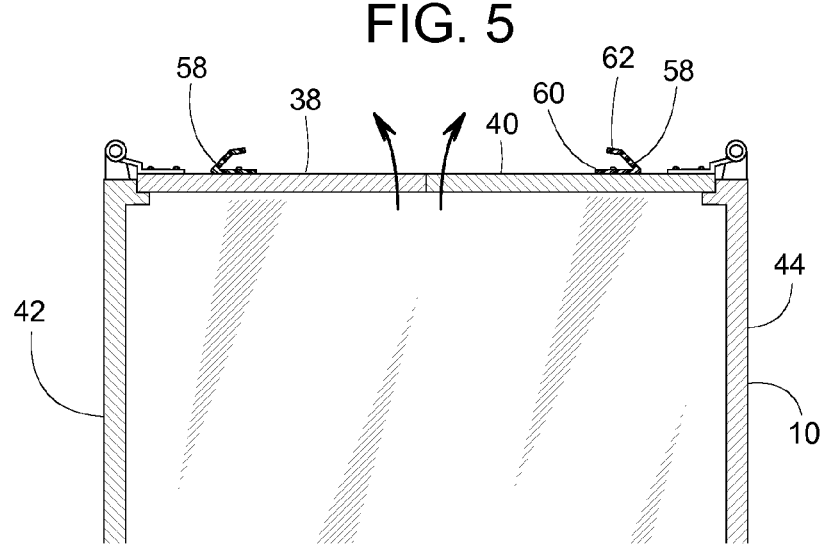
FIG. 5 is a cross-sectional view similar to FIG. 3 but showing an alternate example of a hinge seal.
Figure 6:
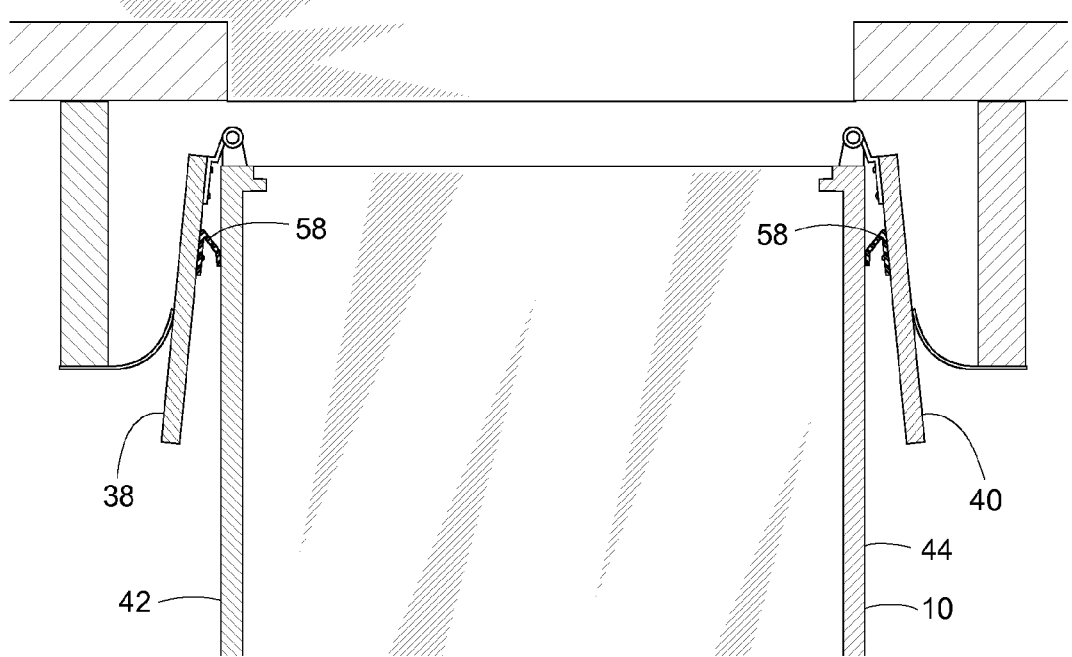
FIG. 6 is a cross-sectional view similar to FIG. 4 but showing the seal of FIG. 5.

In a similar example, shown in FIGS. 5 and 6, a lip-style seal 58 replaces tubular seal 34. Seal 58 includes a mounting flange 60 and a sealing lip 62. Flange 60 allows seals 58 to be attached to rear door panels 38 and 40, and lips 62 sealingly engage side body panels 42 and 44 when the door is fully open.

Figure 7:
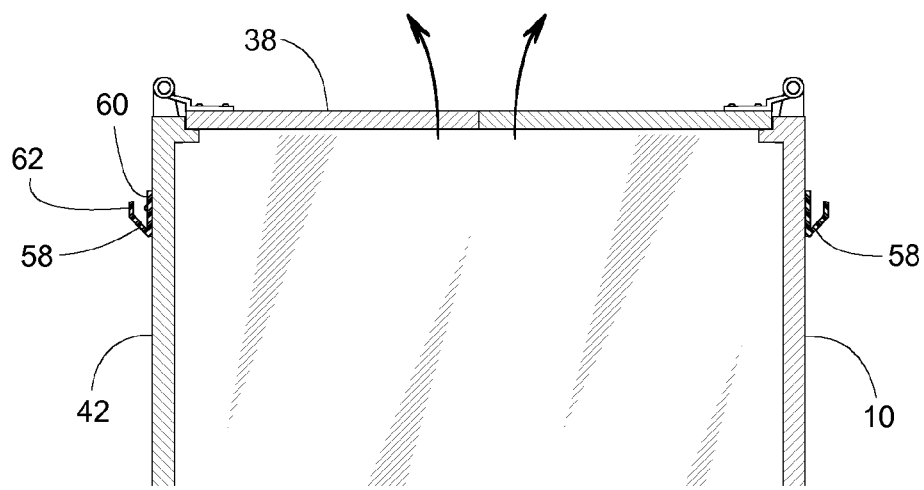
FIG. 7 is a cross-sectional view similar to FIGS. 3 and 5 but showing another example of a hinge seal.
Figure 8:
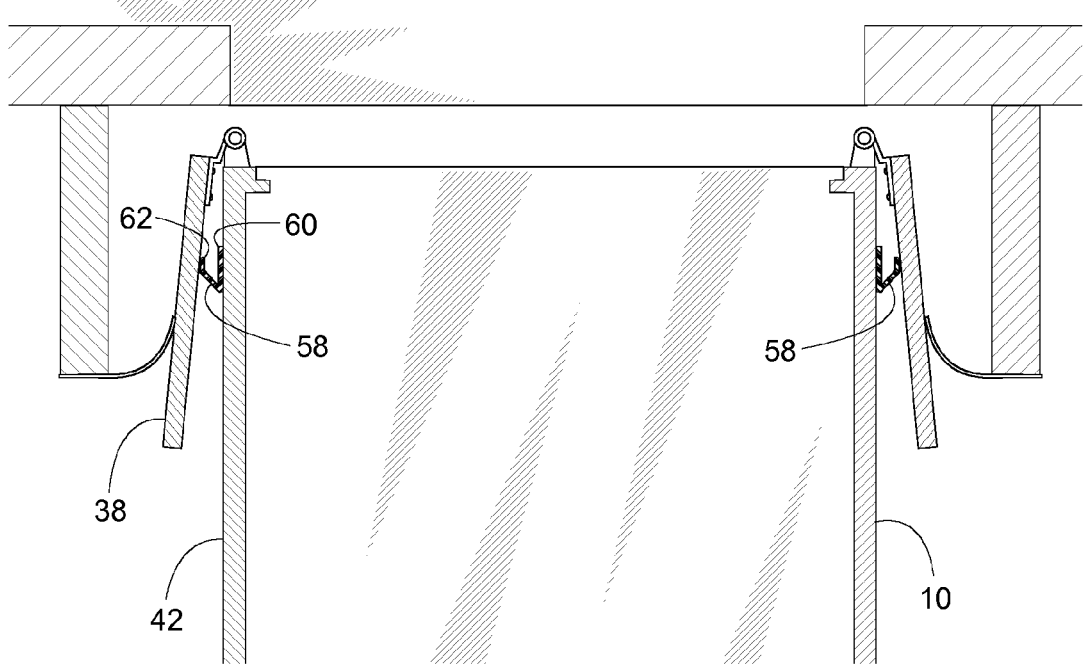
FIG. 8 is a cross-sectional view similar to FIGS. 4 and 6 but showing the seal of FIG. 7.

Alternatively, seals 58 can be installed as shown in FIGS. 7 and 8. In this case, flange 60 attaches seal 58 to side body panel 42, and lip 62 sealingly engages rear door panel 38 when the door is fully open.

Figure 9:
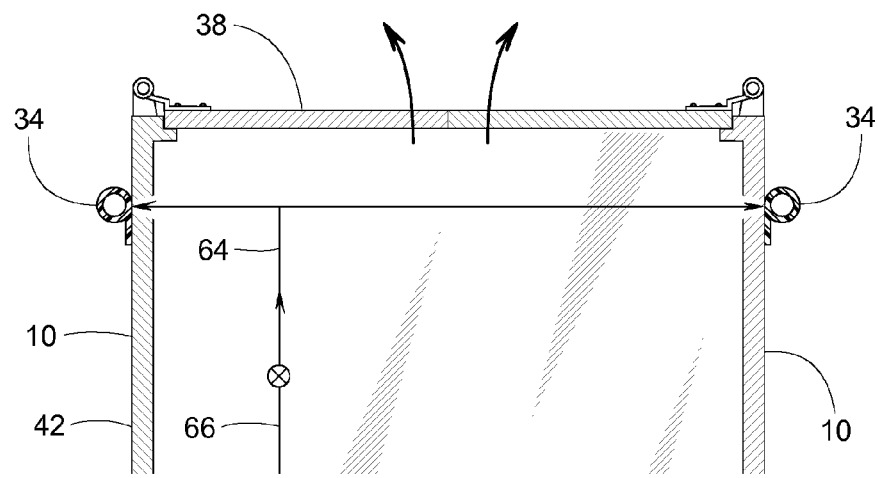
FIG. 9 is a cross-sectional view similar to FIGS. 3, 5 and 7 but showing yet another example of a hinge seal.
Figure 10:
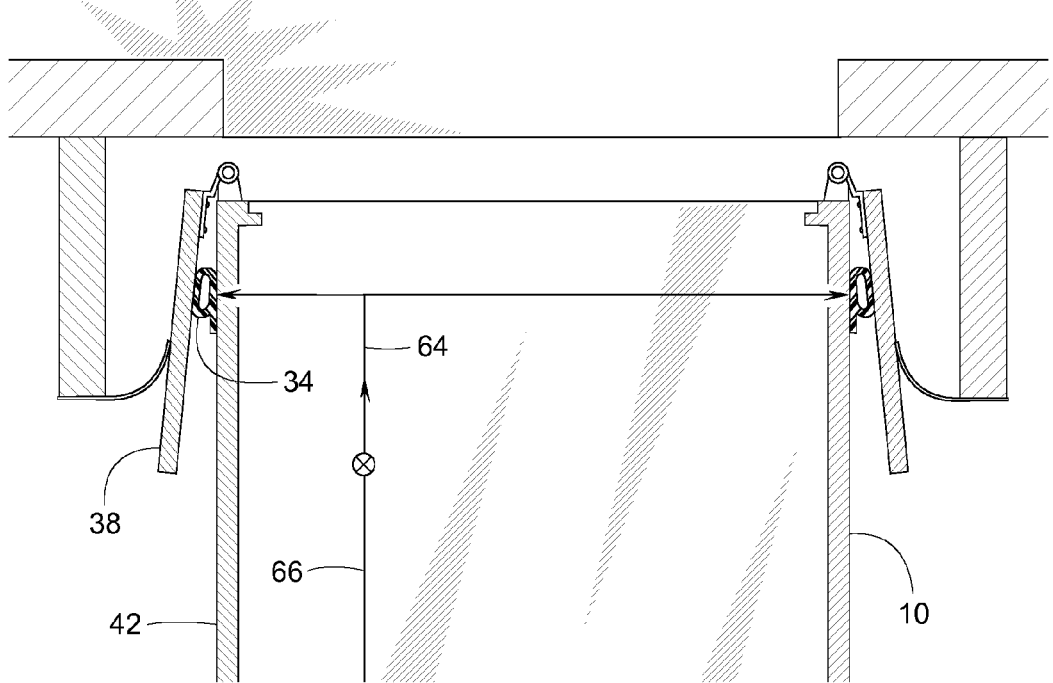
FIG. 10 is a cross-sectional view similar to FIGS. 4, 6 and 8 but showing the seal of FIG. 9.
Figure 11:
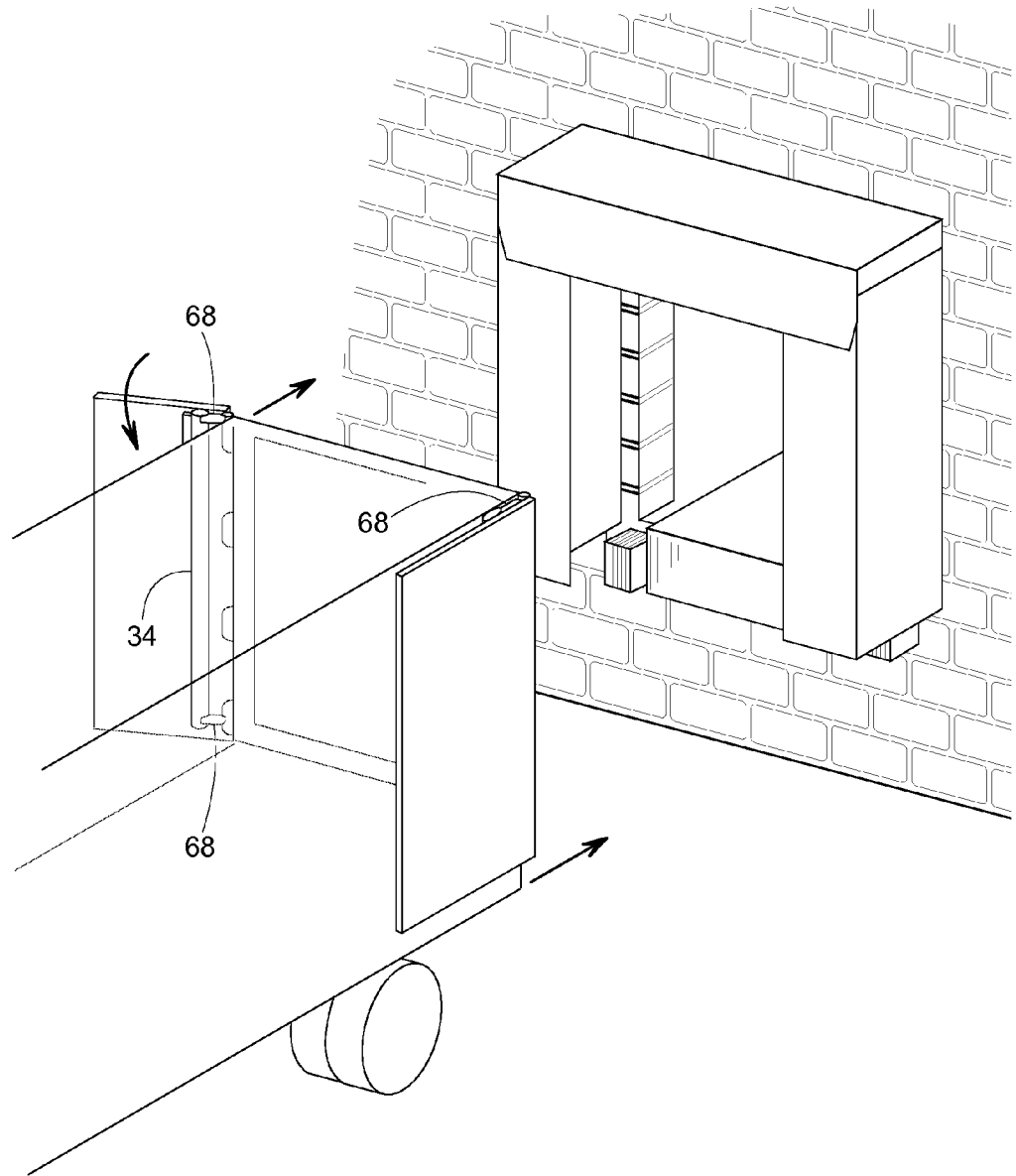
FIG. 11 is a perspective view similar to FIG. 1 but showing an alternate example.
Figure 12:
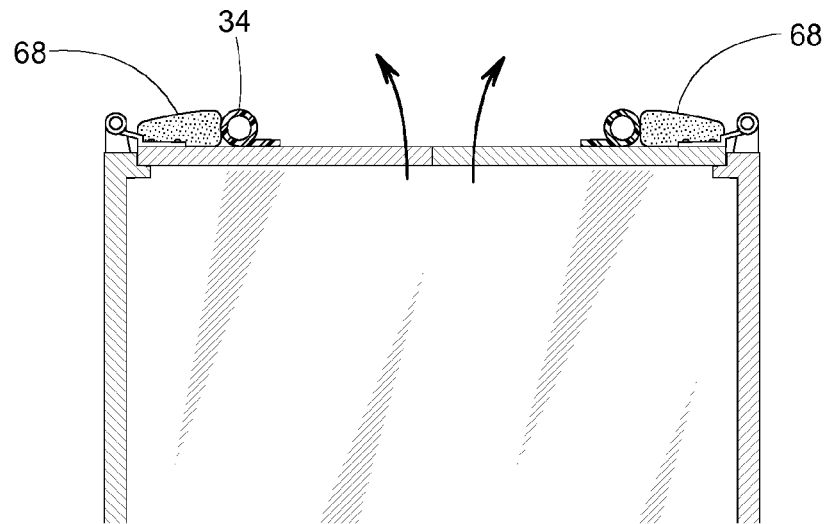
FIG. 12 is a cross-sectional top view similar to FIG. 3 but showing the example of FIG. 11.
Figure 13:
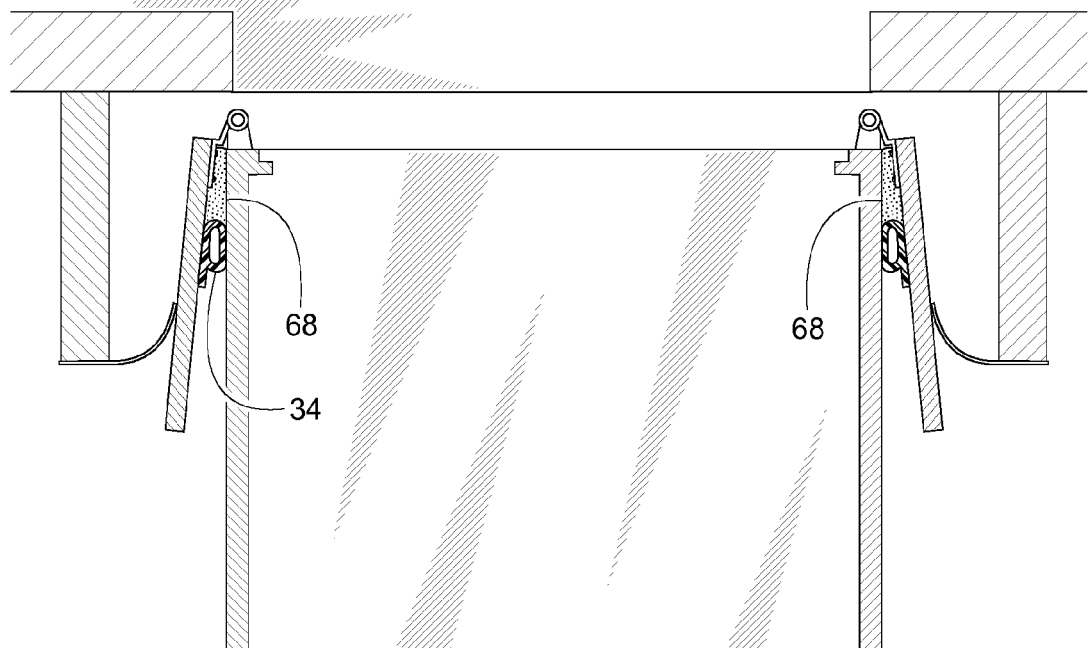
FIG. 13 is a cross-sectional top view similar to FIG. 4 but showing an alternate example.
Figure 14:
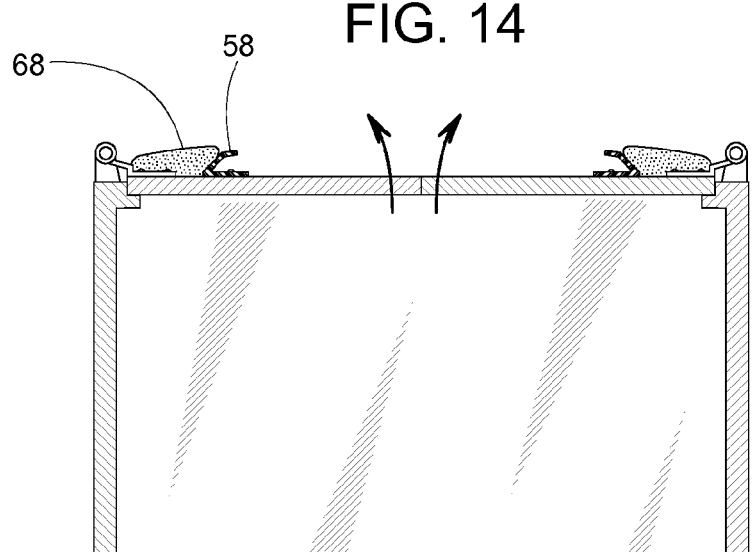
FIG. 14 is a cross-sectional top view similar to FIG. 5 but showing the example of FIG. 11.
Figure 15:
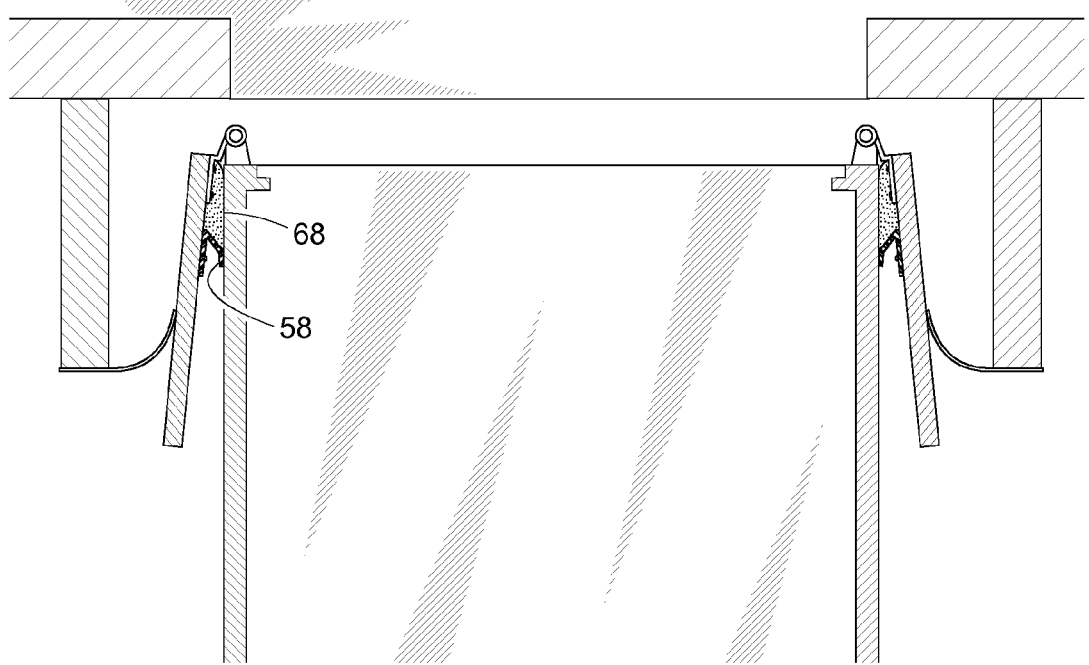
FIG. 15 is a cross-sectional top view similar to FIG. 6 but showing an alternate example.
Figure 16:
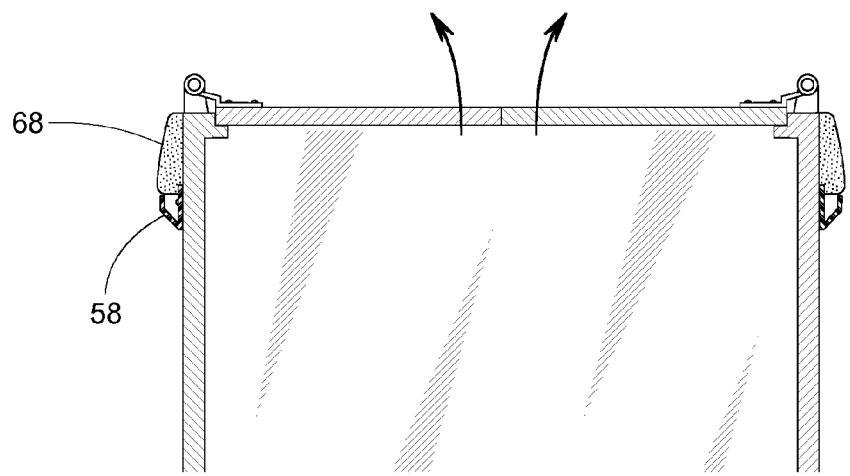
FIG. 16 is a cross-sectional top view similar to FIG. 7 but showing the example of FIG. 11.
Figure 17:
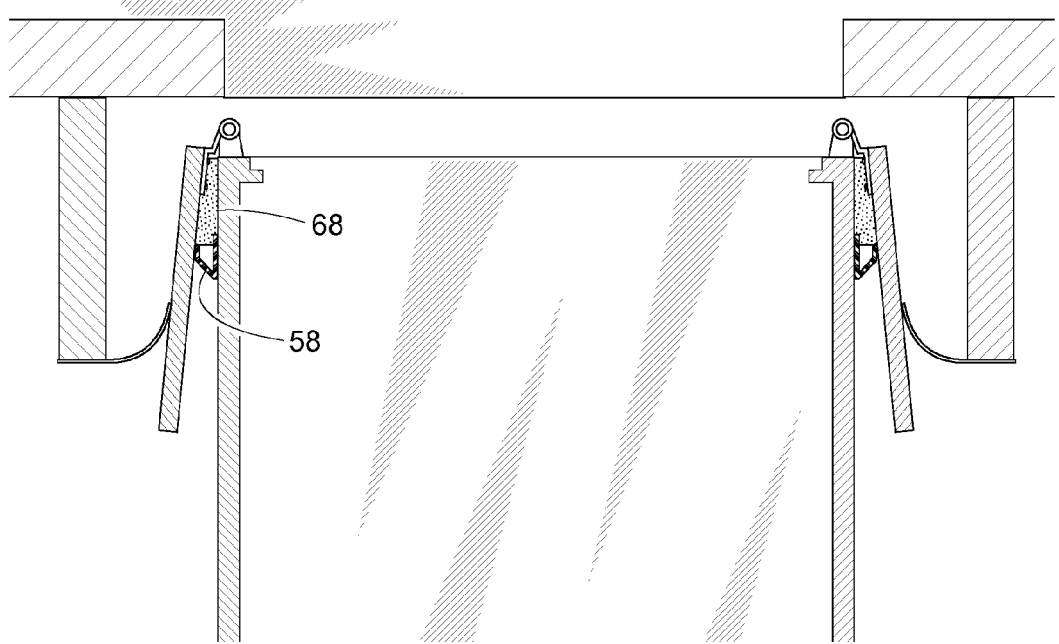
FIG. 17 is a cross-sectional top view similar to FIG. 8 but showing an alternate example.
Figure 18:
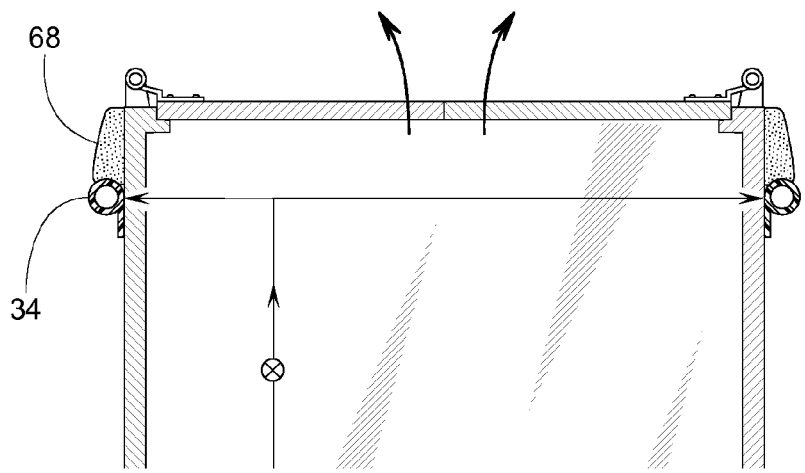
FIG. 18 is a cross-sectional top view similar to FIG. 9 but showing the example of FIG. 11.
Figure 19:
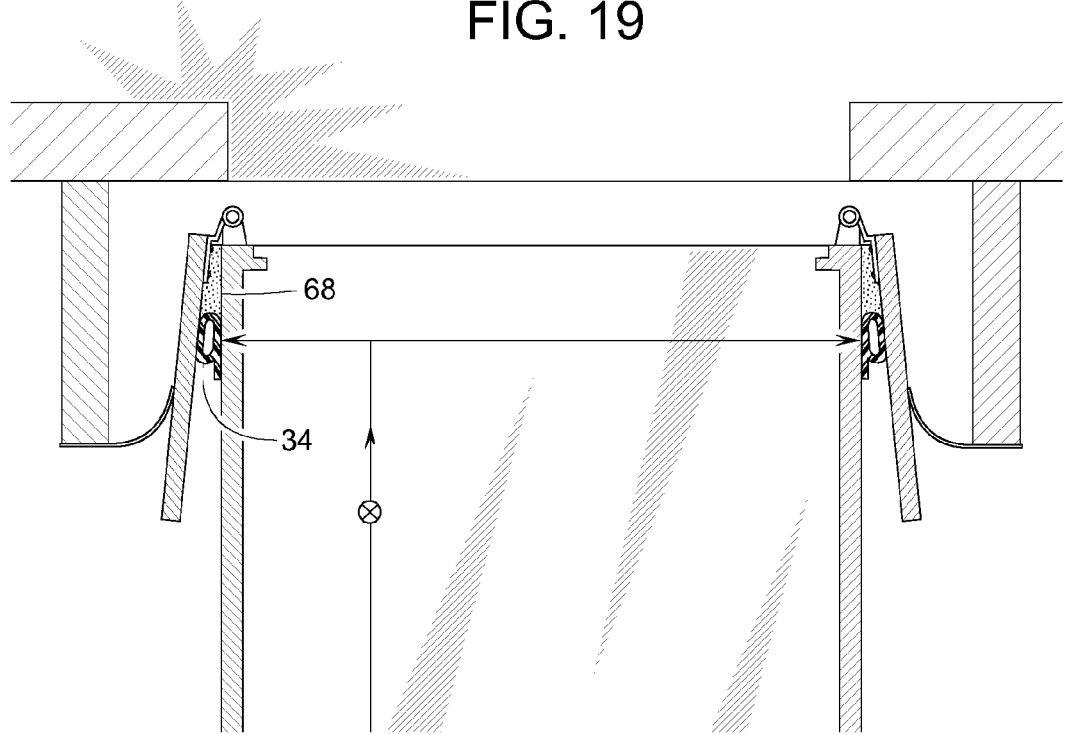
FIG. 19 is a cross-sectional top view similar to FIG. 10 but showing an alternate example.

The alternate mounting arrangement of FIGS. 7 and 8 also applies to seal 34 of FIGS. 3 and 4. FIGS. 9 and 10, for example, show how seal 34 can be attached to side body panel 42 and sealingly engage rear door panel 38 when the door is fully open.

Because seal 34 is hollow, it is conceivable to close off the ends of the seal 34 so that seal 38 can be selectively pressurized by a source of pressurized fluid 64 supplied by, for example, a conventional pneumatic brake system 66 of vehicle 10. Alternatively, seal 34 could be hermetically sealed to contain a permanent charge of compressible gas.

Because any seal attached to a vehicle will be exposed to harsh conditions as the vehicle travels from one location to the next, it may be desirable to provide a seal constructed of a more rigid, wear resistant material or to provide a seal that lays flat against the vehicle when not in use. For example, a flat blade seal may be hingedly attached to the vehicle such that it can selectively pivot between a stored position, wherein it lays substantially flat against a vehicle panel, and an operative position, wherein it projects out from a vehicle panel. A seal of this type may be manually or automatically actuated.

For additional sealing, a horizontal seal 68 can be used for closing the gaps that may exist between a vertical seal (e.g., seals 34 or seal 58) and the upper and lower rear corners of vehicle 10. Seal 68 is shown in FIGS. 11-19 as being made of resiliently compressible foam and having a generally trapezoidal shape; however, other shapes and materials are well within the scope of the invention. Seal 68, for example, could be rectangular, triangular, or have a shape similar to that of seal 34 or seal 58. FIGS. 11-19 illustrate how FIGS. 1, and 2-10 would appear upon adding seal 68, wherein FIG. 11 corresponds to FIG. 1, and FIGS. 12-19 correspond to FIGS. 3-10 respectively.

Figure 20:
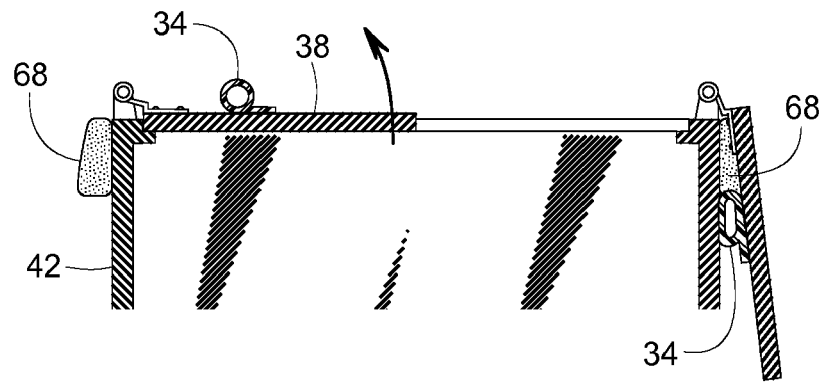
FIG. 20 is a cross-sectional top view of another example.
Figure 21:
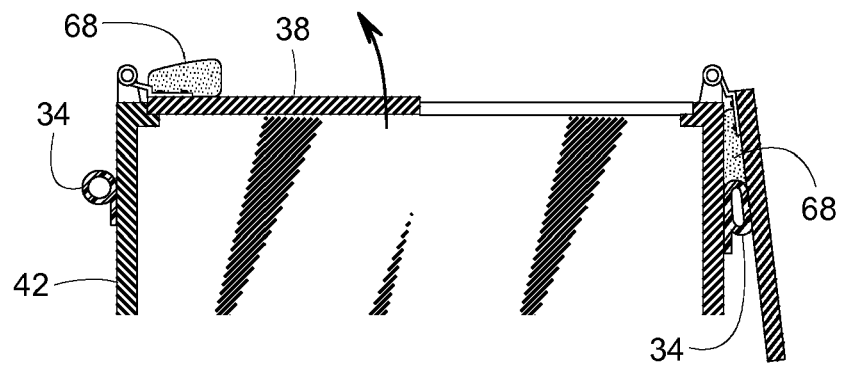
FIG. 21 is a cross-sectional top view of another example.

FIGS. 20 and 21 show how seals 34 and 68 do not have to be attached to the same panel. In FIG. 20, for instance, seal 34 is attached to door panel 38 while seal 68 is attached to side body panel 42. Seals 34 and 42 are positioned such that when the door is open, as shown at the right side of FIG. 20, seals 34 and 42 mate to close the gap between them. The arrangement shown in FIG. 21 is similar; however, seal 34 is mounted to body panel 42 and seal 68 is attached to door panel 38.

Figure 22:
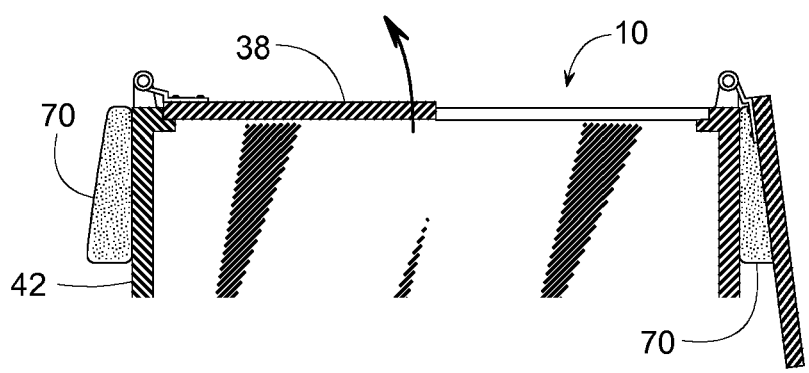
FIG. 22 is a cross-sectional top view of another example.
Figure 23:
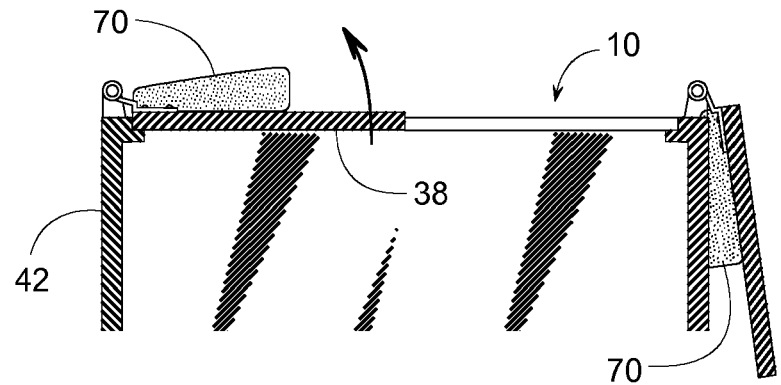
FIG. 23 is a cross-sectional top view of another example.

In another example, seals 34 and 68 are replaced by a single seal 70 that extends vertically along the full height of either rear vertical edge of vehicle 10. The cross-sectional area of seal 70 can be trapezoidal, rectangular, triangular or any other appropriate shape. Seal 70 can be attached to side panel 42, as shown in FIG. 22, or attached to door panel 38, as shown in FIG. 23. Seal 70 may be particularly useful for sealing against a corrugated or ribbed surface.

Although the invention is described with reference to various examples, it should be appreciated by those of ordinary skill in the art that various modifications are well within the scope of the invention. Therefore, the scope of the invention is to be determined by reference to the following claims.

I claim:

1. A sealing system for a vehicle with a hinge that pivotally connects a rear door panel to a side body panel such that the rear door panel can pivot about a substantially vertical axis between a closed position where the rear door panel is substantially perpendicular to the side body panel and an open position where the rear door panel is generally parallel to the side body panel, wherein the rear door panel and the side body panel define a hinge gap when the rear door panel is at the open position, the sealing system comprising:

a hinge seal mounted to at least one of the rear door panel or the side body panel such that the hinge seal disengages the other of the rear door panel or the side body panel as the rear door panel pivots to the closed position, and the hinge seal engages both the rear door panel and the side body panel to bridge the hinge gap when the rear door panel is at the open position.

2. The sealing system of claim 1, wherein the hinge seal is spaced apart from the rear door panel when the hinge seal is attached to the side body panel and the rear door panel is at the closed position.

3. The sealing system of claim 1, wherein the hinge seal is adapted to be connected to a source of pressurized fluid associated with a brake system of the vehicle.

4. A sealing system for a vehicle with a hinge that pivotally connects a rear door panel to a side body panel such that the rear door panel can pivot about a substantially vertical axis between a closed position where the rear door panel is substantially perpendicular to the side body panel and an open position where the rear door panel is generally parallel to the side body panel, wherein the rear door panel and the side body panel define a hinge gap when the rear door panel is at the open position, the sealing system comprising:
   a hinge seal adapted to be mounted to at least one of the rear door panel or the side body panel such that the hinge seal disengages the other of the rear door panel or the side body panel as the rear door panel pivots to the closed position, and the hinge seal engages both the rear door panel and the side body panel to bridge the hinge gap when the rear door panel is at the open position, wherein the hinge seal is spaced apart from the side body panel when the hinge seal is attached to the rear door panel and the rear door panel is at the closed position.

5. The sealing system of claim 1, wherein the hinge seal is hollow.

6. A sealing system comprising:
   a side body panel of a vehicle;
   a rear door panel of the vehicle;
   a hinge that connects the rear door panel to the side body panel such that the rear door panel can pivot about a substantially vertical axis between a closed position where the rear door panel is substantially perpendicular to the side body panel and an open position where the rear door panel is generally parallel to the side body panel, wherein the rear door panel and the side body panel define a hinge gap when the rear door panel is at the open position; and
   a hinge seal attached to at least one of the rear door panel or the side body panel;
   such that the hinge seal disengages from the other of the rear door panel and the side body panel as the rear door panel pivots to the closed position, and the hinge seal engages both the rear door panel and the side body panel to bridge the hinge gap when the rear door panel is at the open position.

7. The sealing system of claim 6, wherein the hinge seal is attached to the rear door panel.

8. The sealing system of claim 6, wherein the hinge seal is attached to the side body panel.

9. The sealing system of claim 6, wherein the hinge seal is spaced apart from the side body panel when the rear door panel is at the closed position.

10. The sealing system of claim 6, wherein the hinge seal is spaced apart from the rear door panel when the rear door panel is at the closed position.

11. The sealing system of claim 6, further comprising a source of pressurized fluid in fluid communication with the hinge seal.

12. The sealing system of claim 11, wherein the vehicle includes a brake system and the source of pressurized fluid is in fluid communication with the brake system.

13. The sealing system of claim 6, wherein the vehicle has a certain maximum width when the rear door panel is at the closed position, the hinge seal lies within the certain maximum width when the rear door panel is at the closed position, and the hinge seal extends beyond the certain maximum width when the rear door panel is at the open position.

14. The sealing system of claim 6, wherein the hinge seal is hollow.

15. A sealing system for a vehicle that includes a hinge that pivotally connects a rear door panel to a side body panel such that the rear door panel can pivot about a substantially vertical axis between a closed position where the rear door panel is substantially perpendicular to the side body panel and an open position where the rear door panel is generally parallel to the side body panel, the rear door panel and the side body panel defining a hinge gap when the rear door panel is at the open position, the vehicle having a certain maximum width when the rear door panel is at the closed position, the sealing system comprising:
   a hinge seal to engage at least one of the rear door panel or the side body panel such that the hinge seal helps bridge the hinge gap when the rear door panel is at the open position, wherein the hinge seal extends beyond the certain maximum width when the rear door panel is in the open position, and the hinge seal is substantially contained within the certain maximum width when the rear door panel is in the closed position, and wherein the hinge seal is spaced apart from the other of the side body panel or the rear door panel when the rear door panel is in the closed position.

16. The sealing system of claim 15, wherein the hinge seal is attached to the rear door panel.

17. The sealing system of claim 15, further comprising a source of pressurized fluid in fluid communication with the hinge seal.

18. The sealing system of claim 17, wherein the vehicle includes a brake system and the source of pressurized fluid is in fluid communication with the brake system.

19. A method of sealing a vehicle relative to a dock shelter, wherein the vehicle includes a rear door panel, a seal member and a side body panel, and the rear door panel can swing to an open position adjacent to a side body panel of the vehicle, the method comprising:
   exerting a sealing force from the dock shelter against the rear door panel; and
   squeezing a seal member between the rear door panel and the side body panel, thereby creating a squeezing reaction force that at least partially opposes the sealing force.

20. A sealing system for a vehicle that includes a hinge that pivotally connects a rear door panel to a side body panel such that the rear door panel can pivot about a substantially vertical axis between a closed position where the rear door panel is substantially perpendicular to the side body panel and an open position where the rear door panel is generally parallel to the side body panel, the rear door panel and the side body panel defining a hinge gap when the rear door panel is at the open position, the sealing system comprising:
   a hinge seal coupled to one of the rear door panel or the side body panel such that the hinge seal also engages the other of the rear door panel or the side body panel when the rear door panel is in the open position and disengages from the other of the rear door panel or the side body panel when the rear door panel is not in the open position.

21. The sealing system of claim 20, wherein the hinge seal is constrained against movement relative to the rear door panel.

* * * * *

UNITED STATES PATENT AND TRADEMARK OFFICE
CERTIFICATE OF CORRECTION

PATENT NO. : 7,695,048 B2
APPLICATION NO. : 11/463527
DATED : April 13, 2010
INVENTOR(S) : David Hoffman Page 1 of 1

It is certified that error appears in the above-identified patent and that said Letters Patent is hereby corrected as shown below:

Column 5, line 38 (claim 6), delete "panel; __ such" and replace with "panel such".

Signed and Sealed this

Twenty-fifth Day of May, 2010

David J. Kappos
*Director of the United States Patent and Trademark Office*